Nov. 15, 1927.                M. W. WEBSTER                1,649,047
                                 NUT LOCK
                            Filed June 14, 1926
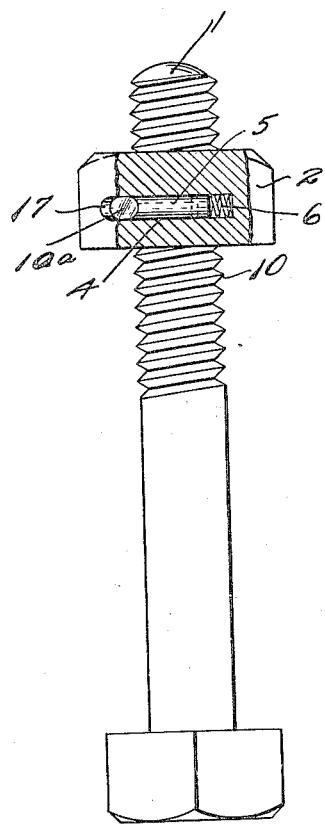
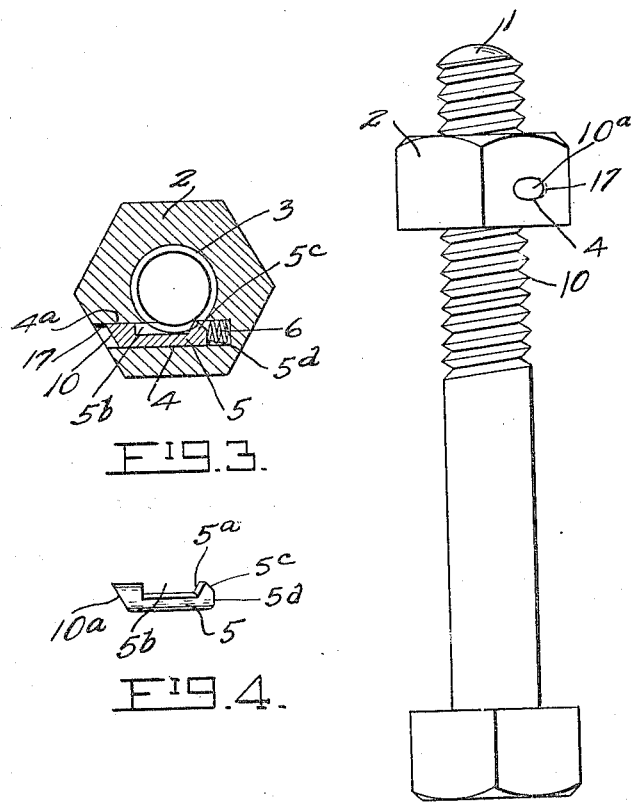
INVENTOR
Milton W. Webster
per Chas H Rickes
Attorney Patented Nov. 15, 1927.

1,649,047

UNITED STATES PATENT OFFICE.

MILTON WARD WEBSTER, OF TORONTO, ONTARIO, CANADA, ASSIGNOR TO ANDREW MacDUFF GLENNY, OF TORONTO, CANADA.

NUT LOCK.

Application filed June 14, 1926. Serial No. 115,828.

My present invention relates to an improvement in that class of nut lock forming the subject matter of Letters Patent of the United States of America No. 1,367,648 dated February 8, 1921, and 1,565,609 dated December 15th, 1925, in which I have shown and described a nut provided with a recess transverse to, and opening into, its bore, and a locking pin, inserted in the recess, for engagement with the bolt, to prevent the nut unscrewing thereon.

In the above construction the locking pin was formed at one end with a retention member which engaged the bolt threads and at the opposite end was constructed to receive a tool for turning the locking pin and releasing the retention member from engagement with the bolt. It sometimes happened, however, that the nut took a position in which it was difficult or impossible to use the turning tool for releasing the locking pin from engagement with the bolt thread and to overcome the trouble arising from that position I have constructed the parts so that the pin will normally maintain its locking position, with the retention member in engagement with the bolt threads and prevent the nut unscrewing, as a result of vibration, but will, upon application of force intentionally applied automatically recede from its locking position and unscrew the nut and permit the nut to be turned off the bolt.

For an understanding of my invention reference is to be had to the following description and accompanying drawings, in which:

Fig. 1 is an elevational view of a bolt and nut assembled, showing the pin retaining means, Fig. 2 is a sectional elevation of a bolt, nut and locking device, Fig. 3 is a horizontal sectional view through the nut and locking device, and Fig. 4 is an elevational view of the pin.

Like numerals of reference refer to like parts throughout the specification and drawings.

The bolt 1 is of usual construction and the nut 2 has, in addition to the threaded bore 3 through which the bolt is entered, a recess or cavity 4 which is tangential to the bore and which communicates therewith. A locking pin 5 of corresponding cross sectional measurements to the cavity 4, is entered within the latter and is formed at its inner end with a tooth or retention member $5^a$. The retention member $5^a$ is substantially V-shaped in cross-section and projects into the bore 3 less than one half the depth of the bolt threads 10. Between the tooth or retention member $5^a$ and the outer end of the locking pin is a cutaway part $5^b$ the length of which is approximately the same as, or slightly greater than, that of the chord formed by the projection of the side $4^a$ of the recess 4 with the bore 3 of the nut. The side $5^c$ of the tooth or retention member $5^a$ is bevelled to the base of the tooth and the inner end of the locking pin from the base of the tooth to the bottom of the locking pin is straight and serves as a seat $5^d$ for engagement with a spring 6 which is inserted between the inner end of the locking pin and the inner end of the recess or cavity to yieldingly resist the inward movement of the pin and normally retain the tooth or retention member in contact with the bolt threads.

The outer end $10^a$ of the pin is bevelled as shown in Fig. 4 to correspond with the facet of the nut and a burr 17 is made on the edge of the recess 4. This burr is designed to engage the outer end of the pin and prevent its accidental displacement when the bolt is being entered in the nut.

To release the locking pin from engagement with the thread of the bolt the nut is turned in the off direction and when a predetermined pressure is applied to the nut the retention member will cut the thread sufficiently to allow the pin to pass out of contact with the bolt threads, the turning of the nut forcing the pin outwardly of the recess until it clears the bolt, after which the nut can be turned off in the usual manner.

Having thus fully described my invention, what I claim as new and desire to secure by Letters Patent is:

A nutlock, comprising a nut having a threaded bore for the bolt and a recess or cavity tangential to the bore, a locking pin of corresponding cross-sectional measurements to the cavity and entered therein, a retention tooth, substantially V-shaped in cross section, at the inner end of the pin and projecting into the bore to less than one-half the depth of the bolt threads, said locking pin having a cutaway part between the retention tooth and its outer end the length of which is approximately the same as that of the chord formed by the projection of the inner side of the recess with the bore of the nut, a spring bearing against the inner end of the pin and the inner end of the recess to maintain the retention tooth in engagement with the bolt threads, and a metal burr at the outer end of the recess overlying and engaging the pin to prevent its accidental displacement within the recess when the bolt is being entered in the nut, the accidental outward displacement of the pin and the inadvertent loosening of the nut being prevented by the engagement of the retention tooth with the bolt threads.

Dated at the city of Toronto, in the county of York, and Province of Ontario, Dominion of Canada, this 20th day of May, 1926.

MILTON WARD WEBSTER.